(12) United States Patent
Nakamura

(10) Patent No.: US 6,471,409 B2
(45) Date of Patent: Oct. 29, 2002

(54) VEHICLE BEARING DEVICE

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 16 days.

(21) Appl. No.: 09/800,510

(22) Filed: Mar. 8, 2001

(65) Prior Publication Data

US 2001/0021285 A1 Sep. 13, 2001

(30) Foreign Application Priority Data

Mar. 9, 2000 (JP) ........................................ 2000-064852
Apr. 27, 2000 (JP) ........................................ 2000-127386

(51) Int. Cl.$^7$ ............................ F16C 33/76; H02K 5/10; H02K 7/10; H02K 19/22
(52) U.S. Cl. ...................... 384/484; 277/931; 384/905; 384/492; 384/493; 384/513
(58) Field of Search ................................ 384/484, 492, 384/493, 513, 907, 905, 605, 557, 900, 463, 527, 477; 310/90, 42, 68 D, 63, 60 R, 62; 277/351, 931

(56) References Cited

U.S. PATENT DOCUMENTS

| 5,422,524 A | | 6/1995 | Nakamura et al. |
| 5,843,369 A | * | 12/1998 | Obara et al. |
| 6,135,641 A | * | 10/2000 | Smith .......................... 384/905 |
| 2001/0021285 A1 | * | 9/2001 | Nakamura .................. 384/484 |

FOREIGN PATENT DOCUMENTS

JP 11-82526 3/1999

* cited by examiner

*Primary Examiner*—Douglas C. Butler
(74) *Attorney, Agent, or Firm*—Oliff & Berridge, PLC

(57) ABSTRACT

A bearing device includes a pair of bearings. One of the bearings is exposed to a higher temperature condition than the other. Each of the bearings has an outer ring, an inner ring, a plurality of rolling members disposed in a space between the outer ring and the inner ring and a pair of sealing members fixed to the outer ring. Each of the sealing members has an elastic lip in contact with an outer surface of the inner ring, and the lip of the bearing exposed to a higher temperature condition is made of a material that is more heat-resistant than the lip of the other sealing member.

9 Claims, 2 Drawing Sheets

VEHICLE BEARING DEVICE

CROSS REFERENCE TO RELATED APPLICATION

The present application is based on and claims priority from Japanese Patent Applications 2000-64852, filed Mar. 9, 2000 and 2000-127386, Apr. 27, 2000, the contents of which are incorporated herein by reference.

BACKGROUND OF THE INVENTION

1. Field of the Invention

The present invention relates to a bearing device for a vehicle rotary machine, such as an AC generator that has a pair of bearings.

2. Description of the Related Art

A vehicle rotary device having a bearing device such as an AC generator is sometimes installed at a position in a vehicle's engine compartment where mud water may splash it.

If a bearing of the bearing device is covered with mud water, the balls of the bearing may rust or the grease of the bearing may deteriorate. As a result, the bearing device generates noise and/or vibration.

JP-A-11-82526 discloses a bearing that has a pair of sealing members covering opposite sides of the bearing to seal a space in which a plurality of rolling members are accommodated. The pair of sealing members has elastic lips in contact with the outer periphery of the inner ring and is fixed to the opposite sides of the outer ring thereof.

However, because such bearings are used under comparatively a high temperature condition, the lips of the sealing member may deteriorate. As a result, the sealing member cannot seal the bearing space completely. If the lips of all the bearings are made of a heat resistant rubber, the bearings become too expensive.

SUMMARY OF THE INVENTION

A main object of the invention is to provide an inexpensive bearing device that is resistant to heavy environmental conditions.

According to a feature of the invention, a bearing device includes a pair of bearings, one of which is exposed to a higher temperature condition than the other. Each of the bearings has an outer ring, an inner ring, a plurality of rolling members disposed in a space between the outer ring and the inner ring and a pair of sealing members fixed to the outer ring to cover the space. Each of the sealing members has an elastic lip in contact with outer surfaces of a corresponding one of the inner rings, and the lip of the bearing exposed to a higher temperature condition is made of a more heat-resistant material than the lip of the other bearing, such as fluoro rubber that is more heat-resistant than any one of nitrile rubber and acrylic rubber.

Therefore, an additional cost for providing a heat-resistant bearing device is very small.

The outer ring of the bearing exposed to a higher temperature condition is preferably made of high carbon-chromium bearing steel that includes silicon at a ratio between 0.5% and 1.2%, which is higher than the material of the outer ring of the other bearing, which usually includes silicon at a ratio between 0.15% and 0.35%.

The outer ring of the bearing exposed to a higher temperature condition may be made of a high carbon-chromium bearing-steel that includes retained austenite of less than 10%.

It is also preferable that the bearing exposed to a higher temperature condition is made of higher anticorrosive material than the other bearing, such as stainless steel or ceramic.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
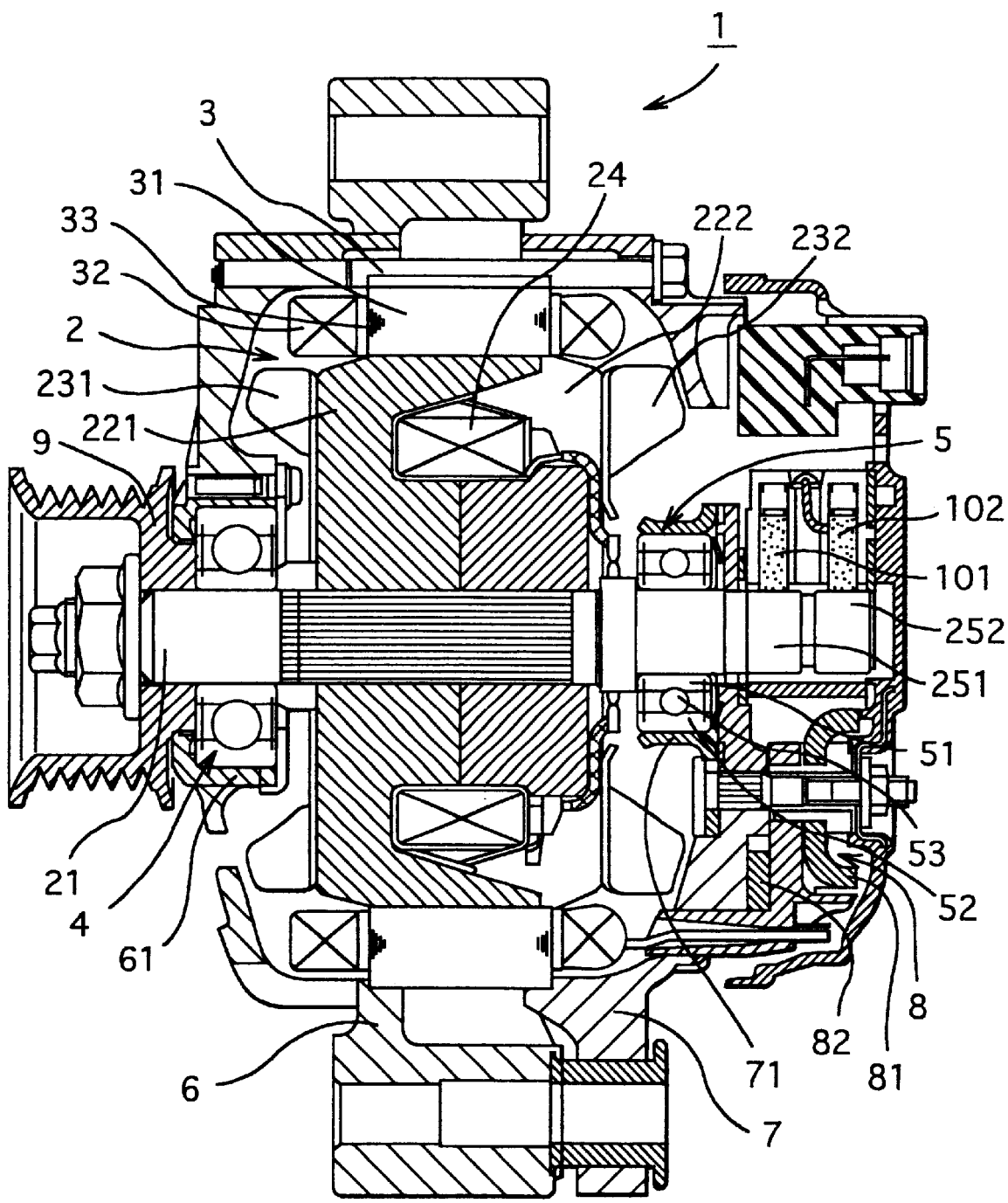
FIG. 1 is a longitudinal cross-sectional view of a vehicle AC generator according to a preferred embodiment of the invention.
Figure 2:
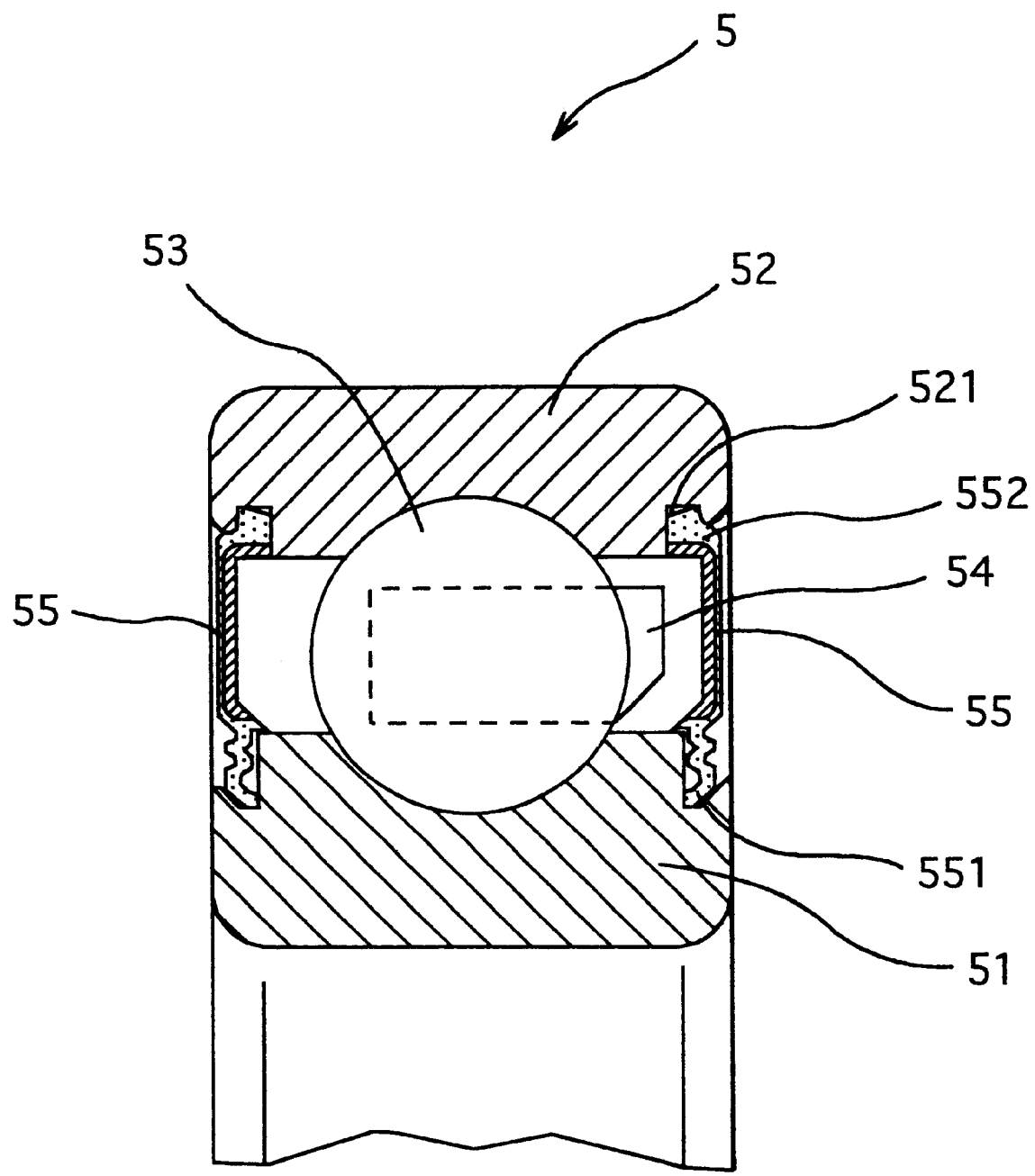
FIG. 2 is a fragmentary enlarged cross-sectional view of A bearing of the AC generator shown in FIG. 1.

A bearing device according to a preferred embodiment of the invention is described with reference to FIGS. 1 and 2. In FIG. 1, the bearing device is a vehicle AC generator 1.

The AC generator 1 includes a rotor 2 having a shaft 21, a stator 3, a pair of front and rear ball bearings 4 and 5 that support the shaft 21 at opposite ends of the rotor 2, a pair of frames 6 and 7, a rectifier unit 8 and a pulley 9.

The rotor 2 has a pair of magnetic pole cores 221 and 222 having a plurality of claw poles fixed to the shaft 21, a field coil 24, a pair of front and rear cooling fans 231 and 232 and a pair of slip rings 251 and 252. The front cooling fan 231 is fixed to the front end of the magnetic pole core 221, and the rear cooling fan 232 is fixed to the rear end of the magnetic pole core 222. A pair of brushes 101 and 102 is fixed to the rear frame 7 at a portion opposite the pair of slip rings 251 and 252. The rear bearing 5 has an inner ring 51 fitted to the shaft 21 and an outer ring fitted to the frame 7 via a bearing box 71.

The rectifier unit 8 has a positive cooling fin 81 and a negative cooling fin 82, which are cooled by the rear fan 232. The negative cooling fin 82 is in contact with the rear frame 7 to be directly cooled by the rear frame 7.

The stator 3 includes a stator core 31, a stator winding 32 and insulators 33 that insulate the stator winding 32 from the stator core 31. The stator 3 is fitted to and held between the inner peripheries of the frames 6 and 7.

The rear bearing 5 has a plurality of balls 53 that are lubricated by grease in a space between the outer ring 52 and the inner ring 51 and a ball holder 54. The balls 53 are made of a stainless steel to prevent the balls 53 from rusting. If the rear bearing 5 carries only a small load, the balls 53 can be made of ceramic. The plurality of balls 53 is aligned by the ball holder 54 in the circumferential direction of the space at equal intervals. The rear bearing 5 has a pair of sealing members 55 that is made of fluoro rubbers and metal rings at the opposite ends thereof. The sealing member 55 has an inner lip 551 and an outer flange 552. The outer ring 52 has an outer-ring groove 521 in which the outer flange 552 is held under compression. Accordingly, the sealing member 55 is fixed to the outer ring 52 so that the inner lip 551 can be brought in contact with the outer periphery of the inner ring 51 under a slight pressure. When the rotor 2 rotates, the lip 551 contacts the inner ring 51 to seal out water or foreign particles. The outer and inner rings 51 and 52 of the rear bearing 5 are made of high-carbon-chromium bearing steel that includes silicon at a ratio between 0.5 and 1.2%, which is higher than ordinary carbon-chromium bearing-steel (SUJ2), and tempered at a temperature between 250° C.–380° C to control retained austenite within 10%. The upper ratio 1.2% of silicon is necessary to prevent the tenacity of the rings 51 and 52. The retained austenite can be also controlled by another process such as a subzero treatment. Accordingly, the rear bearing 5 retains the rigidity thereof even if the temperature thereof rises by 20° C. to a temperature about 180° C. or much higher temperature than the front bearing 4, and the thermal expansion of the groove 521 due to high temperature can be reduced. Therefore, the outer flange 552 of the sealing members 55 can be tightly held in the grooves 521.

The front bearing 4 is made of the ordinary carbon-chromium bearing-steel, which includes the retained austenite more than 10% and silicon at a ratio between 0.15 and 0.35. The front bearing 4 has sealing members made of nitrile rubber or polyacrylic rubber. It is noted that the rear bearing 5 is more remote from the pulley 9 than the front bearing 4.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. A bearing device including a pair of bearings, one of which is exposed to a higher temperature condition than the other, each of said bearings having an outer ring, an inner ring, a plurality of rolling members disposed in a space between said outer ring and said inner ring and a pair of sealing members fixed to said outer ring to respectively cover said space, each of said sealing members having an elastic lip in contact with outer surfaces of a corresponding one of said inner rings, and a shaft rotatably supported by said pair of bearings, wherein said lip of one of said pair of bearings exposed to a lower temperature is made of one of nitrile rubber and acrylic rubber, and the other lip exposed to a higher temperature is made of a high temperature resistant material that is more heat-resistant than any one of nitrile rubber and acrylic rubber.

2. The bearing device as claimed in claim 1, wherein said outer ring of said bearing exposed to a higher temperature condition is made of high carbon-chromium bearing-steel that includes silicon at a ratio between 0.5% and 1.2%.

3. The bearing device as claimed in claim 2, wherein said outer ring of said bearing exposed to a higher temperature condition is made of high carbon-chromium bearing-steel that includes retained austenite at a ratio less than 10%.

4. The bearing device as claimed in claim 3, wherein said plurality of rolling members is made of one of stainless steel and ceramic.

5. The bearing device as claimed in claim 1, further comprising a pulley carried by said shaft at one end thereof, wherein said bearing exposed to a higher temperature condition is disposed more remote from said pulley than said bearing exposed to said lower temperature.

6. The bearing device as claimed in claim 1, wherein said bearing device is disposed in an AC generator having a slip ring and a brush unit, and said slip ring and said brush unit is disposed near said bearing exposed to a higher temperature.

7. A bearing device including a pair of bearings, one of which is exposed to a higher temperature condition than the other, each of said bearings having an outer ring, an inner ring, a plurality of rolling members disposed in a space between said outer ring and said inner ring and a pair of sealing members fixed to said outer ring to respectively cover said space, each of said sealing members having an elastic lip in contact with outer surfaces of a corresponding one of said inner rings, and a shaft rotatably supported by said pair of bearings, wherein said lip of said bearing exposed to a higher temperature is made of a higher temperature resistant material than the other bearing and said outer ring of said bearing exposed to a higher temperature condition is made of high carbon-chromium bearing-steel that includes silicon at a ratio between 0.5% and 1.2%.

8. A bearing device including a pair of bearings, one of which is exposed to a higher temperature condition than the other, each of said bearings having an outer ring, an inner ring, a plurality of rolling members disposed in a space between said outer ring and said inner ring and a pair of sealing members fixed to said outer ring to respectively cover said space, each of said sealing members having an elastic lip in contact with outer surfaces of a corresponding one of said inner rings, and a shaft rotatably supported by said pair of bearings, wherein said lip of said bearing exposed to a higher temperature is made of a higher temperature resistant material than the other bearing and said outer ring of said bearing exposed to a higher temperature condition is made of high carbon-chromium bearing-steel that includes retained austenite at a ratio less than 10%.

9. A bearing device including a pair of bearings, one of which is exposed to a higher temperature condition than the other, each of said bearings having an outer ring, an inner ring, a plurality of rolling members disposed in a space between said outer ring and said inner ring and a pair of sealing members fixed to said outer ring to respectively cover said space, each of said sealing members having an elastic lip in contact with outer surfaces of a corresponding one of said inner rings, and a shaft rotatably supported by said pair of bearings, wherein said lip of said bearing exposed to a higher temperature is made of a higher temperature resistant material than the other bearing and said plurality of rolling members is made of one of stainless steel and ceramic.

\* \* \* \* \*